May 26, 1964 H. KNUTTI 3,134,841
TELE-PHOTO LENS
Filed Sept. 11, 1961
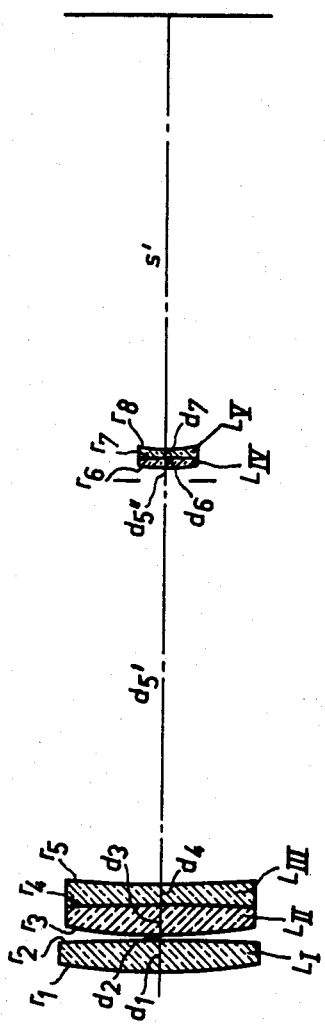

United States Patent Office 3,134,841
Patented May 26, 1964

3,134,841
TELE-PHOTO LENS
Helmut Knutti, Oberkochen, Wurttemberg, Germany, assignor to Carl Zeiss, Heidenheim (Brenz), Wurttemberg, Germany
Filed Sept. 11, 1961, Ser. No. 138,224
Claims priority, application Germany Sept. 24, 1960
1 Claim. (Cl. 88—57)

The present invention concerns a tele-photo lens corrected for spherical aberration, coma, astigmatism, for curvature of the image field and for distortion as well as chromatically with an aperture ratio of at least $f:8$ and with an image-side focal length between 25 and 40% of the focal length of the objective, which is constructed of an object-side collective partial system and of an image-side dispersive partial system, wherein both said partial systems are separated from each other by a large air space containing the diaphragm and wherein the object-side partial system consists of a collective single lens as the front element and of a compound component of meniscus shape concave towards the diaphragm and combined from two lenses of opposing refractive powers cemented together, while the image-side partial-system consists of two single lenses of opposing refracting powers. For the design of the tele-photo lens according to the invention it is characterized that it is to have an extremely long focal length of approximately 500 mm. which is to be more than four times the length of the diagonal of the image field to be covered with full definition and in that it is suitable for use in cameras of a type where the adjusting of the central shutter and of the diaphragm is effected from the camera body and wherein the objective with this extremely long focal length is also suitable for attaching to a commercially available shutter with a free passage aperture of 24 mm. diameter. For the purpose of solving the said task the tele-photo lens according to the invention is constructed and designed in such a way that the individual focal length of the object-side partial system and the numerical value of the individual focal length of the image-side partial system lie within the limits of 0.4 times and 0.7 times the focal length of the entire objective, that furthermore the ratio of the axial length of the diaphragm space to the focal length of the object-side partial system is greater than 0.45 but less than 0.7 and that the axial thickness of the front element is less than 10% of the focal length of the entire objective.

Tele-photo lenses suitable for attachment to commercially available between-the-lens-shutters with a maximum predetermined aperture of 17 mm. are fundamentally of prior art. The designs which have been made public are, however, not advantageous for extremely long focal lengths and not even suitable. Useful solutions may be obtained for instance in cases of focal lengths up to about 2.5 to 3 times the length of the image field diagonal. If the principles of design published for those focal lengths were to be applied to objectives of extremely long focal lengths e.g. of 500 mm. and with an image size of 6x6 cm. then they would lead to excessive thickness of the collective anterior partial system and to unjustifiable outlay.

For the indicated use it is advantageous if the length of the diaphragm space lies between 0.25 times and 0.4 times the focal length of the entire system and if the diaphragm is located in the immediate vicinity of the image-side partial system.

Furthermore it is advantageous, for the purpose of easier manufacture and for the attainment of favourable astigmatic correction, if the lenses of the rear partial system are cemented together, and if the said partial system is constructed as a meniscus turning its concave side towards the image plane wherein the collective lens stands on the diaphragm side and is of greater dispersion than the dispersive lens cemented to it.

One embodiment of an objective according to the invention is represented in the appended illustration in section. It is computed for a focal length of 500 mm. Its aperture ratio is $f:8$. The values given in the following table refer to a focal length $f=1$. The individual focal length of the anterior collective partial system amounts to $+0.591$ and the individual focal length of the rear dispersive partial system amounts to $-0.481$.

In the table are designated:
By L, the lenses,
By r, the radii,
By d, the thicknesses and air spaces,
By $n_d$, the refractive indices, and
By $v_d$, the Abbe numbers.

Table

| Lenses | Radii | Axial Separations | $n_d$ | $v_d$ |
| --- | --- | --- | --- | --- |
| $L_I$ | $r_1=+0.51704$ | $d_1=0.0240$ | 1.51009 | 63.37 |
|  | $r_2=-2.05840$ | $d_2=0.0004$ |  |  |
| $L_{II}$ | $r_3=+0.37134$ | $d_3=0.0240$ | 1.51821 | 65.18 |
|  | $r_4=-1.54358$ |  |  |  |
| $L_{III}$ |  | $d_4=0.0160$ | 1.75520 | 27.53 |
|  | $r_5=+0.90632$ | $d_5'=0.3190$ |  |  |
|  |  | $d_5''=0.0100$ |  |  |
|  | $r_6=+0.24464$ |  |  |  |
| $L_{IV}$ |  | $d_6=0.0070$ | 1.62004 | 36.34 |
|  | $r_7=-0.59708$ |  |  |  |
| $L_V$ |  | $d_7=0.0060$ | 1.62041 | 60.29 |
|  | $r_8=+0.13176$ | Back focal length $s'=0.3428$. |  |  |

I claim:
A tele-photo objective lens system of an aperture ratio of at least $f:8$ and with an image-side focal intercept between 25 and 40% of the focal length of the objective preferably for use in a single-lens reflex camera with automatic control of shutter and diaphragm from the camera body consisting of an object-side collective partial system and of an image-side dispersive partial system separated from each other by a large air space containing the diaphragm the length of said diaphragm space lying between 0.25 times and 0.4 times the focal length of the entire telephoto objective lens system, and the diaphragm being located in the immediate vicinity of the image side dispersive partial system, wherein the object-side partial system consists of a single collective lense as the front element and of a compound component of meniscus shape concave towards the diaphragm combined of two lenses of opposing refractive powers cemented together as the rear component while the image-side partial system consists of two single lenses of opposing refractive powers, cemented together and forming a meniscus compound component turning its concave side towards the image plane, the collective lens standing on the diaphragm side and having a greater dispersion than the dispersive lens cemented to it, the individual focal length of the object-side partial system and the numerical value of the individual focal length of the image-side partial system lying between 0.4 times and 0.7 times the focal length of the entire lens system and the ratio between the axial length of the diaphragm space and the focal length of the object-side partial system being greater than 0.45 but less than 0.7, and the thickness of the front element being less than 10% of the focal length of the entire objective lens system.

References Cited in the file of this patent

UNITED STATES PATENTS

| | | |
|---|---|---|
| 2,660,093 | Betele | Nov. 24, 1953 |
| 2,907,248 | Lautenbacher | Oct. 6, 1959 |

FOREIGN PATENTS

| | | |
|---|---|---|
| 398,431 | Germany | July 14, 1924 |
| 1,067,235 | Germany | Oct. 15, 1959 |
| 1,218,166 | France | May 9, 1960 |